s011814970B2

United States Patent
Shenouda et al.

(10) Patent No.: US 11,814,970 B2
(45) Date of Patent: *Nov. 14, 2023

(54) SYSTEM AND METHOD FOR MEASURING AN AXIAL POSITION OF A ROTATING COMPONENT OF AN ENGINE

(71) Applicant: PRATT & WHITNEY CANADA CORP., Longueuil (CA)

(72) Inventors: Antwan Shenouda, Mississauga (CA); Ella Yakobov, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,418

(22) Filed: Jul. 11, 2022

(65) Prior Publication Data

US 2022/0341344 A1 Oct. 27, 2022

Related U.S. Application Data

(63) Continuation of application No. 16/699,193, filed on Nov. 29, 2019, now Pat. No. 11,428,116.

(51) Int. Cl.
*F01D 21/00* (2006.01)
*G01P 3/46* (2006.01)

(52) U.S. Cl.
CPC ............ *F01D 21/003* (2013.01); *G01P 3/46* (2013.01); *F05D 2220/323* (2013.01);
(Continued)

(58) Field of Classification Search
CPC .......... F01D 21/003; F01D 17/06; G01P 3/46; G01P 3/488; F05D 2220/323;
(Continued)

(56) References Cited

U.S. PATENT DOCUMENTS 3,115,032 A 12/1963 Northern et al.
4,602,515 A 7/1986 Eichenlaub
(Continued)

FOREIGN PATENT DOCUMENTS

EP 0353076 A2 1/1990
EP 0802414 A2 10/1997

OTHER PUBLICATIONS

Arthur J. Hill, Shaft Axial-Displacement Sensor, NTIS Tech Notes, US Department of Commerce, vol. F, No. 6, Jun. 1986, p. 690, XP008011239, ISSN: 0889-8464.
(Continued)

*Primary Examiner* — J. Todd Newton
(74) *Attorney, Agent, or Firm* — Norton Rose Fulbright Canada LLP (57) ABSTRACT

Methods and systems for measuring an axial position of a rotating component of an engine are described herein. The method comprises obtaining a signal from a sensor coupled to the rotating component, the rotating component having a plurality of position markers distributed about a surface thereof, the position markers having an axially varying characteristic configured to cause a change in a varying parameter of the signal as a function of the axial position of the rotating component. Based on the signal, the method comprises determining a rotational speed of the rotating component from the signal, determining the varying parameter of the signal, and finding the axial position of the rotating component based on a known relationship between the axial position, the rotational speed, and the varying parameter of the signal.

19 Claims, 6 Drawing Sheets

(52) U.S. Cl.
CPC ...... *F05D 2240/60* (2013.01); *F05D 2260/80* (2013.01); *F05D 2270/309* (2013.01); *F05D 2270/708* (2013.01)

(58) Field of Classification Search
CPC ............. F05D 2240/60; F05D 2260/80; F05D 2270/309; F05D 2270/708; G01D 5/2454; G01B 7/14; G01B 7/003
See application file for complete search history.

(56) References Cited

U.S. PATENT DOCUMENTS

| | | | |
|---|---|---|---|
| 4,833,405 | A | 5/1989 | Richards et al. |
| 4,934,901 | A | 6/1990 | Duchesneau |
| 5,570,016 | A | 10/1996 | Schroeder et al. |
| 5,731,702 | A | 3/1998 | Schroeder et al. |
| 5,897,293 | A | 4/1999 | Arel et al. |
| 5,913,659 | A | 6/1999 | Doolin et al. |
| 6,077,040 | A | 6/2000 | Pruden et al. |
| 6,566,867 | B1 | 5/2003 | Schroeder et al. |
| 8,687,206 | B2 | 4/2014 | Hockaday |
| 8,692,543 | B2 | 4/2014 | Sanchez Exposito et al. |
| 9,091,703 | B2 | 7/2015 | Mulcaster |
| 9,821,901 | B2 | 11/2017 | Duke et al. |
| 10,392,962 | B2 | 8/2019 | Rowe et al. |
| 11,420,772 | B2 * | 8/2022 | Tomescu ................. G01D 5/145 |
| 11,428,116 | B2 * | 8/2022 | Shenouda ............. F01D 21/003 |
| 2006/0123909 | A1 | 6/2006 | Rettig et al. |
| 2008/0191691 | A1 | 8/2008 | Baudendistel et al. |
| 2012/0119730 | A1 | 5/2012 | Sanchez Exposito et al. |
| 2012/0158341 | A1 | 6/2012 | Ueda et al. |
| 2012/0262160 | A1 * | 10/2012 | Michalski, Jr. ........ G01D 5/246 324/207.25 |
| 2014/0007591 | A1 | 1/2014 | Khibnik et al. |
| 2015/0069940 | A1 | 3/2015 | Lee et al. |
| 2018/0205336 | A1 | 7/2018 | Nakagawa |
| 2019/0137534 | A1 * | 5/2019 | Costello ................. G01P 3/488 |
| 2020/0200036 | A1 | 6/2020 | Petersen et al. |
| 2020/0200789 | A1 | 6/2020 | Shepherd et al. |
| 2021/0114716 | A1 | 4/2021 | Yakobov et al. |
| 2021/0164359 | A1 * | 6/2021 | Shenouda ............. F01D 21/003 |
| 2022/0364908 | A1 * | 11/2022 | Wei .......................... G01P 3/14 |

OTHER PUBLICATIONS

European Patent Office, Communication re extended European search report in connection with related European Patent Application No. 20210463.4, dated Mar. 30, 2021.

* cited by examiner

SYSTEM AND METHOD FOR MEASURING AN AXIAL POSITION OF A ROTATING COMPONENT OF AN ENGINE

CROSS-REFERENCE TO RELATED APPLICATION AND CLAIM OF PRIORITY

The present application is a continuation of U.S. patent application Ser. No. 16/699,193, filed Nov. 29, 2019, the entire contents of which are hereby incorporated by reference.

TECHNICAL FIELD

The present disclosure relates generally to measuring the axial position of rotating components in engines.

BACKGROUND OF THE ART

The axial position of rotating components in engines, such as gas turbine engines, can be measured using various techniques. One common technique is to use straight teeth and slanted teeth on a rotating wheel, and to measure the time difference between the slanted and straight teeth as the wheel rotates. Slanted teeth take up a lot of angular space on the wheel, thus limiting the number of teeth on a given wheel size. This can limit the accuracy of the measurement.

Therefore, improvements are needed.

SUMMARY

In accordance with a broad aspect, there is provided a method for measuring an axial position of a rotating component of an engine. The method comprises obtaining a signal from a sensor coupled to the rotating component, the rotating component having a plurality of position markers distributed about a surface thereof, the position markers having an axially varying characteristic configured to cause a change in a varying parameter of the signal as a function of the axial position of the rotating component. Based on the signal, the method comprises determining a rotational speed of the rotating component from the signal, determining the varying parameter of the signal, and finding the axial position of the rotating component based on a known relationship between the axial position, the rotational speed, and the varying parameter of the signal.

In accordance with another broad aspect, there is provided system for measuring an axial position of a rotating component of an engine. The system comprises a plurality of position markers distributed about a surface of a rotating component, the position markers having an axially varying characteristic, a sensor coupled to the rotating component and configured for generating a signal having a varying parameter as the rotating component rotates, and a measuring circuit coupled to the sensor. The measuring circuit is configured for obtaining the signal from the sensor, determining a rotational speed of the rotating component from the signal, determining the varying parameter of the signal, and finding the axial position of the rotating component based on a known relationship between the axial position, the rotational speed, and the varying parameter of the signal.

In accordance with yet another broad aspect, there is provided non-transitory computer readable medium having stored thereon program instructions executable by a processing unit for measuring an axial position of a rotating component of an engine. The program instructions are configured for obtaining a signal from a sensor coupled to the rotating component, the rotating component having a plurality of position markers distributed about a surface thereof, the position markers having an axially varying characteristic configured to cause a change in a varying parameter of the signal as a function of the axial position of the rotating component. Based on the signal, the program instructions are configured for determining a rotational speed of the rotating component from the signal, determining the varying parameter of the signal, and finding the axial position of the rotating component based on a known relationship between the axial position, the rotational speed, and the varying parameter of the signal.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
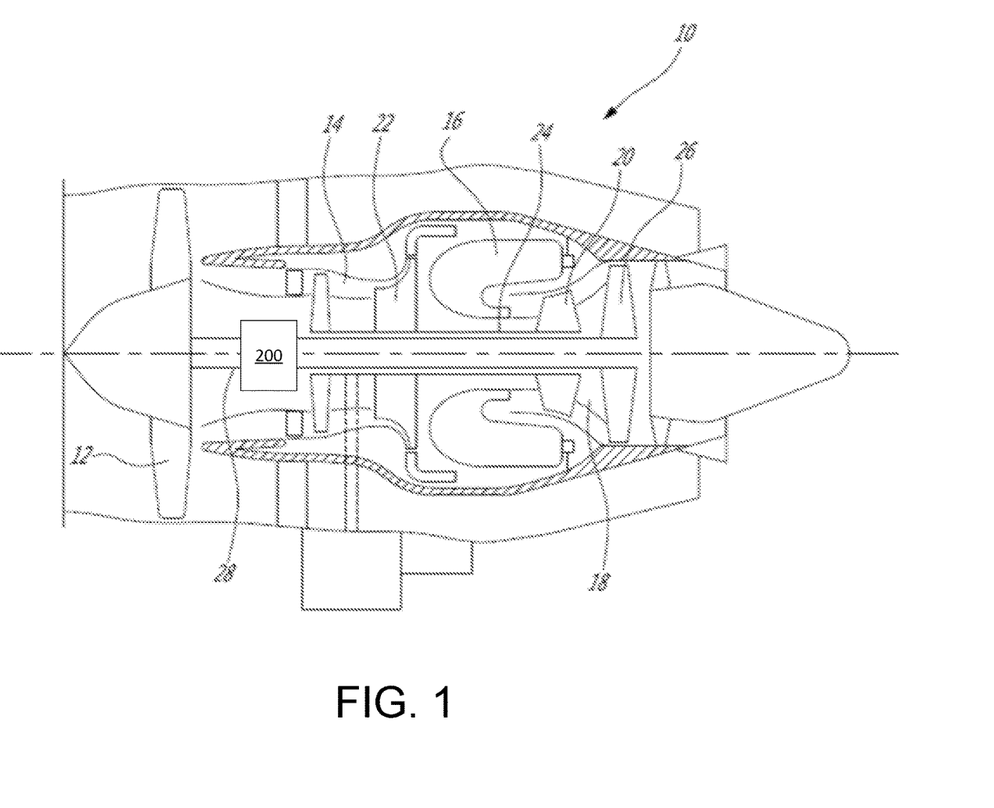
FIG. 1 is a schematic cross-sectional view of an example gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. The engine 10 may be for flight applications, industrial applications, or the like.

Figure 2:
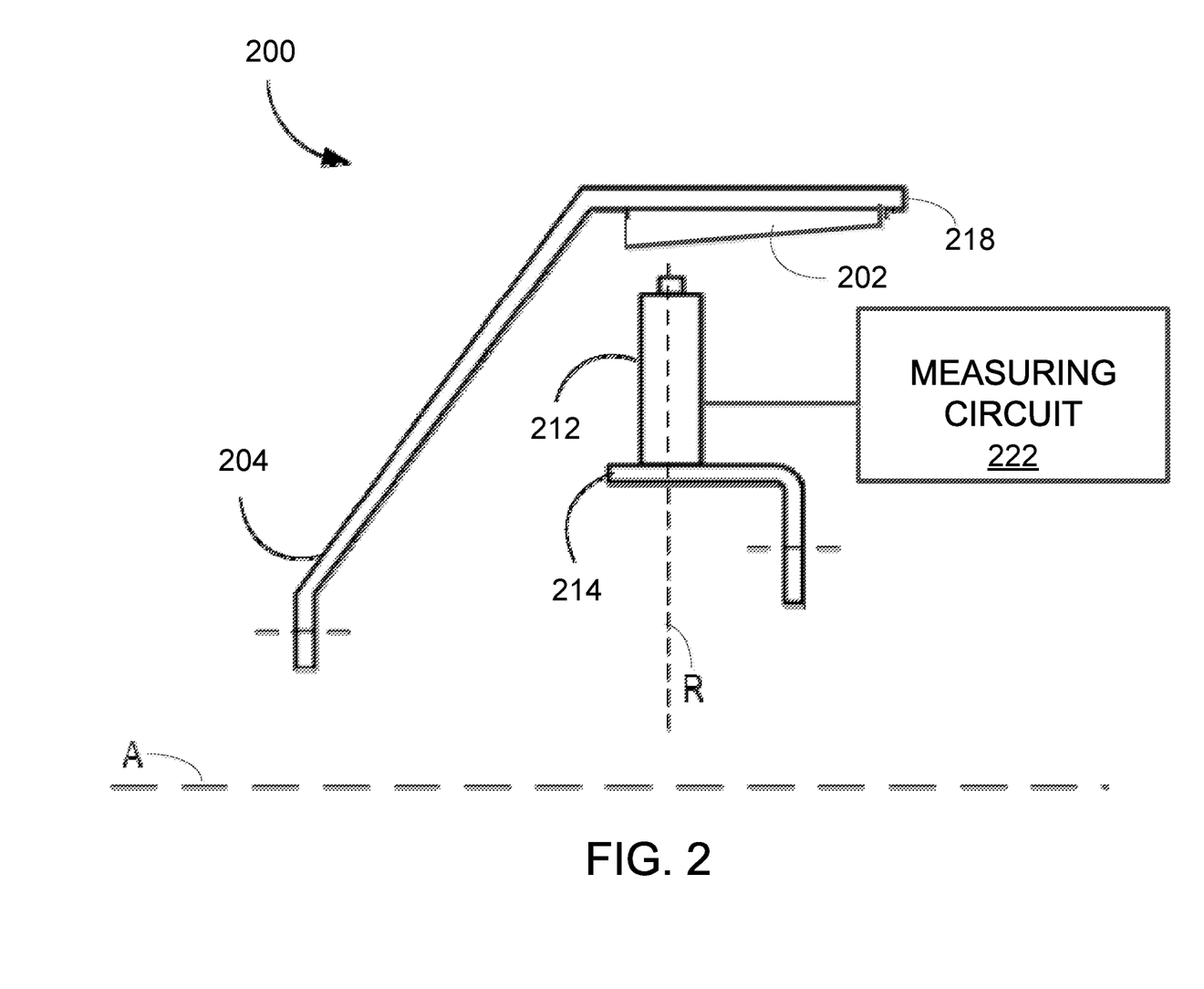
FIG. 2 is a schematic side view of an example system for measuring an axial position of a rotating component of an engine.

Referring to FIG. 2, there is illustrated an example system 200 for measuring an axial position of a rotating component of an engine, such as the engine 10. It should be noted that although the present disclosure focuses on the use of the system 200 in gas turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

In some embodiments, the system 200 may be used to determine the axial position of the high pressure shaft 24 or the low pressure shaft 28 of engine 10. In some embodiments, the system 200 may be used to determine the axial position of high/low pressure rotors of a gas turbine engine, such as the high pressure rotors 20 of the turbine section 18, or the high pressure rotors 22 of the compressor section 14. In yet other embodiments, the system 200 may be used to determine the axial position of an aircraft propeller, for example of a turboprop engine. Other embodiments may also apply.

The system 200 comprises a feedback device 204 and one or more sensors 212 positioned proximate the feedback device 204. The feedback device 204 is composed of an annular member having a plurality of circumferentially-spaced apart and detectable position markers 202 disposed thereon for detection by sensor(s) 212. In some embodiments, the position markers 202 and sensor(s) 212 may be disposed on a radially-outer side of feedback device 204. Alternatively, the position markers 202 and sensor(s) 212 may be disposed on a radially-inner side of feedback device 204. Several position markers 202 may be spaced about the circumference (i.e., the perimeter) of the feedback device 204 at a known distance. In addition, the feedback device 204 can include any suitable number of position markers 202, which can vary based on the dimensions of the feedback device 204. In some embodiments, the feedback device 204 is a phonic wheel and the position markers 202 are equally spaced teeth distributed across the phonic wheel. In some embodiments, the position markers 202 are provided directly on the rotating component and the feedback device is omitted.

In one embodiment, the one or more sensors 212 are fixedly mounted to a static portion of the engine 10. In other embodiments, the one or more sensors 212 are mounted for rotation with the rotating component and to move axially with the axial displacement of the rotating component, and the feedback device 204 (or position markers 202) is fixedly mounted to a static portion of the engine 10.

In some embodiments, the feedback device 204 is mounted for rotation with a rotating component of the engine 10 and to move axially along rotation axis 'A' to a plurality of axial positions, with axial displacement of the rotating component. An axial position of the feedback device 204 may then correspond to a respective axial position of the rotating component, and the position markers 202 may be useful for detecting the axial position of the feedback device 204 as the feedback device 204 and rotating component rotate. The feedback device 204 may therefore be useful for detecting the axial position of the rotating component by way of correlation.

The system 200 also includes a measuring circuit 222 communicatively coupled to the one or more sensors 212. The sensor(s) 212 are configured for producing one or more sensor signals which are transmitted to or otherwise received by the measuring circuit 222. The sensor signal can be an electrical signal, digital or analog, DC or AC, or any other suitable type of signal. The sensor signal may be an optical signal or another type of electromagnetic signal. The sensor(s) 212 may produce a signal pulse in response to detecting the presence of a position marker 202 in a sensing zone of the sensor 212. The signal pulse has a varying parameter as a function of the axial position of the rotating component.

The varying parameter may be the amplitude of the signal, for example when the signal is an electrical or an electromagnetic signal. The varying parameter may be the time it takes for the signal to be received, either as reflected by a passive position marker 202 or as emitted by an active position marker 202.

In some embodiments, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic permeability within the magnetic field generated by the sensor 212.

Other embodiments may also apply, for example having optical/light-based sensor(s) 212 and position markers 202, or radar-based sensors(s) 212 and position markers 202. Any sensor capable of generating a signal having a parameter that varies as a function of the axial position of the rotating component, whether due to a varying distance or a varying material of the position marker 202, may be used. In some embodiments, the varying parameter of the signal is amplitude (e.g. magnetic sensors, optical sensors, etc), represented by voltage, intensity, and the like. Although the embodiments illustrated herein use amplitude as the varying parameter of the sensor signal, it will be understood that this is a specific and non-limiting example used for illustrative purposes only.

With continued reference to FIG. 2, a side view of a portion of a feedback device 204 and sensor 212 in accordance with at least some embodiments is shown. The sensor 212 is mounted to a flange 214 of a housing (for example of a reduction gearbox), so as to be positioned adjacent the plurality of position markers 202, which extend away from the feedback device 204 and towards the sensor 212. The sensor 212 may be mounted at any suitable angle relative to the position markers 202, including perpendicularly thereto. In some embodiments, the sensor 212 is secured to the rotating component so as to extend away from the flange 214 and towards the position markers 202 along a radial direction, identified in FIG. 2 as direction 'R'. Sensor 212 and flange 214 may be fixedly mounted, for example to the housing of a reduction gearbox or to any other static element of the engine 10, as appropriate.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis 'A') travelled by the feedback device 204 is too large for the range of the sensors 212. It should be understood that any suitable number of sensors 212 may apply and the number of sensors 212 and their positions may be optimized according to the specifics of the application.

Figure 3A:
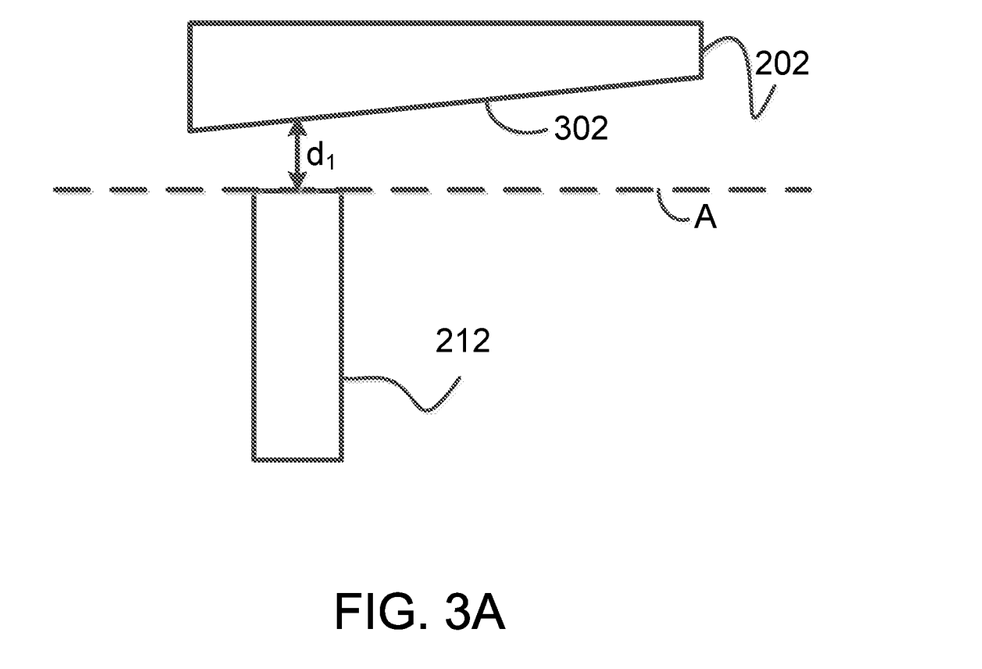
FIGS. 3A-3B are examples illustrating a variable air gap between a sensor and a position marker.
Figure 3B:
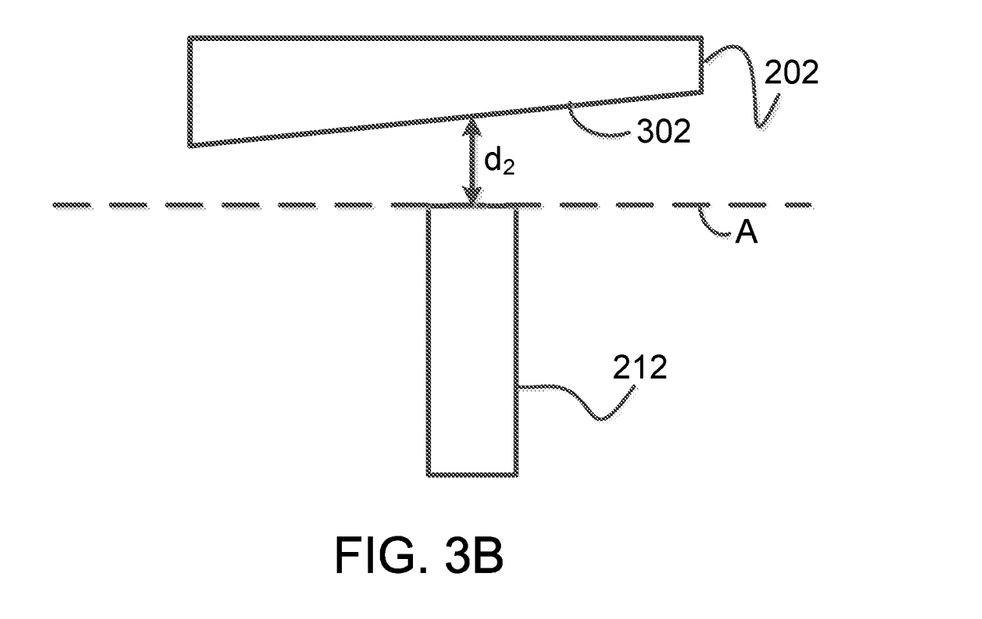

The position markers 202 have an axially varying characteristic configured to cause a change in a varying parameter to the sensor signal as a function of a relative position of the sensor 212 to the position marker 202 as the component rotates. In some embodiments, the axially varying characteristic of the position markers 202 is a varying geometry along the rotational axis A. For example, the axially varying characteristic may be a sloped surface that changes an air gap between the sensor 212 and the position marker 202 axially. An example is illustrated in FIGS. 3A-3B. As the feedback device 204 translates along axis 'A', the air gap between a sloped surface 302 of the position marker 202 and the sensor 212 varies. FIG. 3A illustrates a first air gap of size $d_1$, FIG. 3B illustrates a second air gap of size $d_2 > d_1$. The axial position of the feedback device 204, and by correlation of the rotating component, is thus related to the size of the air gap.

In some embodiments, the sensor 212 is a variable reluctance speed sensor, and the amplitude of the sensor signal is a function of the geometry of the position markers 202, magnetic properties of the position markers 202, electrical load, rotational speed, and the air gap. By keeping the electrical load and magnetic properties constant, the air gap may be determined as a function of speed. In other words, for a given rotational speed of the feedback device 204, the sensor 212 will produce a signal having an amplitude that will vary as a function of the air gap between the sensor 212 and the position marker 202.

In some embodiments, the surface 302 is sloped along a single direction, namely along the rotational axis 'A'. In other embodiments, the surface 302 is sloped along two or more directions, for example along the rotational axis 'A' and along a direction perpendicular to the rotational axis 'A', such that the air gap varies axially and transversely. Other embodiments may also apply. The slope of the surface 302 may be linear or non-linear.

The position markers 202 may be separated by troughs that may or may not be sloped themselves. In some embodiments, the geometry of the feedback device 204 is constant throughout an axial cross-section of the feedback device 204, such that the position markers 202 and troughs move away from the sensor at a same rate as the component moves axially. This may lead to a smoother sensor signal, as generated by the sensor 212. In other embodiments, different axial slopes are provided for the position markers 202 and the troughs. For example, in some embodiments the position markers 202 are sloped while the troughs are kept constant.

In some embodiments, the axially varying characteristic of the position marker 202 is the permeability of the position marker 202 along surface 302. Indeed, a position marker 202 of varying permeability along the rotational axis 'A' will also cause the signal strength of the sensor 212 to vary as a function of axial position. The varying amplitude may then be used to determine permeability for a given speed, which can be correlated to an axial position. Other geometric and/or material-based parameters of the position markers 202 may be used to induce the change in parameter of the sensor signal as a function of axial position.

The axially varying characteristic of the position marker 202 is therefore used to obtain a sensor signal having a given parameter, which can be correlated to an axial position using the rotational speed of the rotating component/feedback device 204. Rotational speed may be determined by detecting the passing of a position marker 202 in front of a sensor 212, for example using a zero-crossing detection technique. Knowing the distance between the position markers 202 and the number of position markers 202 on the feedback device 204, the speed can then be determined. Other techniques for finding the rotational speed may also be used, such as using an optical sensor or deriving speed from another measured speed in the engine.

A known relationship between axial position, rotational speed, and varying parameter is used to find the axial position, as demonstrated in Table 1.

TABLE 1

| ROTATIONAL SPEED | AX_P1 | AX_P2 | AX_P3 | AX_P4 |
|---|---|---|---|---|
| SP_1 | AMP_1 | AMP_5 | AMP_9 | AMP_13 |
| SP_2 | AMP_2 | AMP_6 | AMP_10 | AMP_14 |
| SP_3 | AMP_3 | AMP_7 | AMP_11 | AMP_15 |
| SP_4 | AMP_4 | AMP_8 | AMP_12 | AMP_16 |

In the example of Table 1, four rotational speeds (SP_X) may be determined. For each rotational speed, four signal amplitudes (AMP_Y) may be obtained. Each pair of rotational speed SP_X and signal amplitude AMP_Y corresponds to an axial position AX_PZ. If the detected signal amplitude is between two values of AMP_Y, the axial position may be based on an interpolation of the two signal amplitudes. The number of rotational speeds, signal amplitudes, and axial positions of Table 1 are illustrative only and can vary depending on practical implementation.

In some embodiments, a known relationship between the varying parameter, rotational speed, and a parameter associated with the axially-vary characteristic of the position markers 202 is used to find the parameter associated with the axially-vary characteristic of the position markers 202, and a correlation between the parameter associated with the axially-vary characteristic of the position markers 202 and axial position is used to determine the axial position of the rotating component. For example, if the axially varying characteristic is a sloped surface of the position marker, the varying parameter is amplitude, and the parameter associated with the axially-vary characteristic is the air gap between the position marker 202 and the sensor 212, then the speed and amplitude of the signal are used to find the air gap, and the air gap is correlated to an axial position. If the axially varying characteristic is the permeability of the material, then the speed and amplitude of the signal are used to find the permeability, and the permeability is correlated to an axial position.

Figure 4:
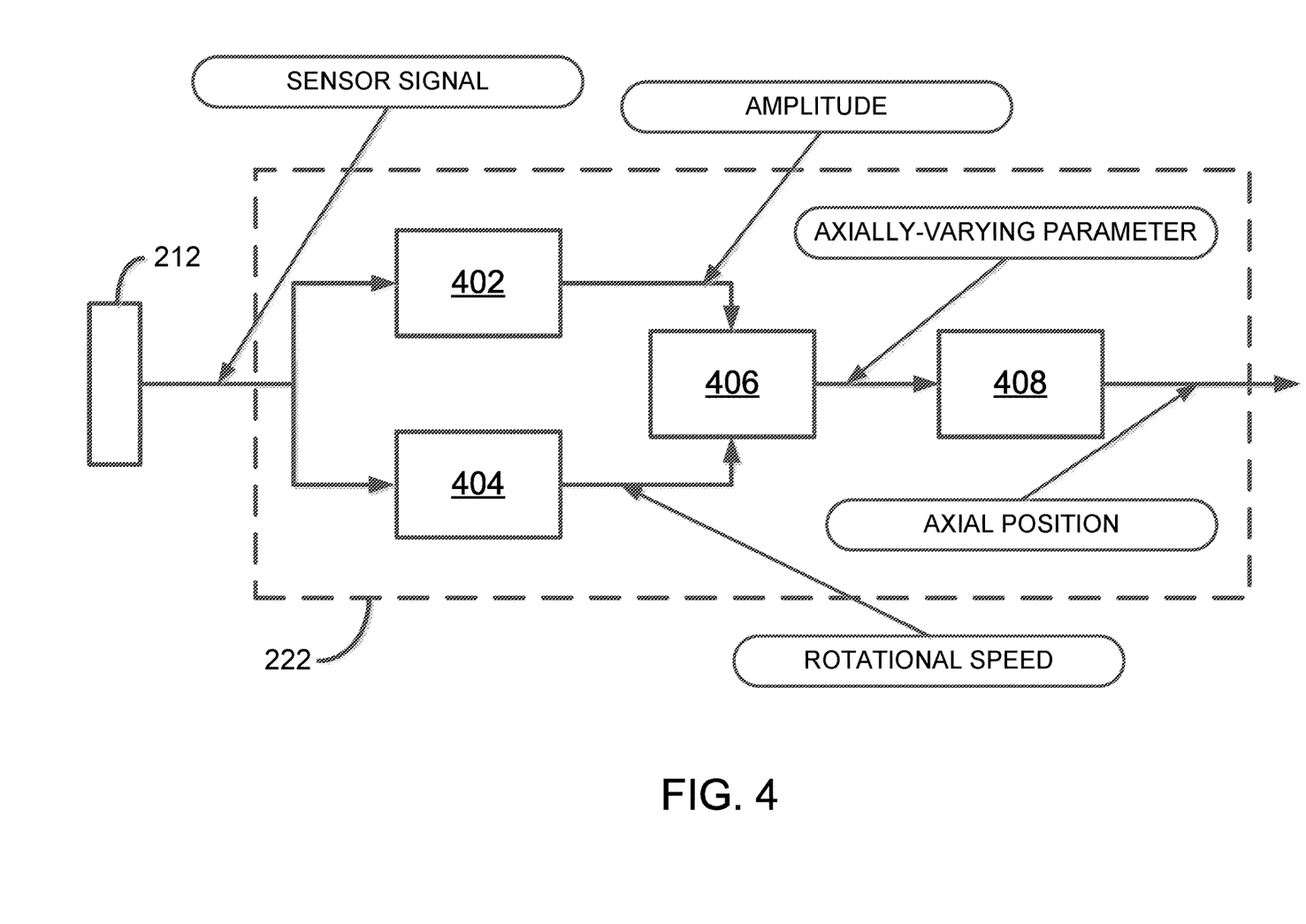
FIG. 4 is a block diagram of an example measuring circuit.

Referring to FIG. 4, there is illustrated an example embodiment for the measuring circuit 222. The sensor signal is received by the measuring circuit 222 from the sensor 212. An amplitude detection unit 402 receives the sensor signal and determines the amplitude of the signal. The amplitude of the signal may be represented as a peak to peak amplitude (e.g. $V_{pk-pk}$) or as an average amplitude (e.g. $V_{rms}$). In some embodiments, the amplitude detection unit 402 is a rectifier circuit, which may be a full wave or a half wave rectifier, depending on the geometry of the feedback device 204. Alternatively, the amplitude detection unit 402 is implemented in software, for example using a peak detection algorithm. Other circuits and/or algorithms may be used to obtain the amplitude or to obtain another varying parameter of the sensor signal.

The sensor signal is also received at a speed detector 404, whereby any known or other speed detection circuit and/or algorithm may be applied in order to obtain the rotational speed at its output. The amplitude and rotational speed are used together at a first look-up table 406 to determine a parameter associated with the axially varying characteristic, such as air gap or permeability of the material. The axially-varying parameter is then input to another lookup table 408 in order to determine axial position. Note that the look-up tables 406, 408 may be replaced with software to apply the known relationships/correlations via equations. Additionally, a single lookup table or equation may be used to apply the known relationships/correlations from the amplitude and rotational speed to the axial position. The relationships/correlations may be represented by linear or non-linear equations. Interpolation can be used to determine values that fall in between look-up table values.

Figure 5:
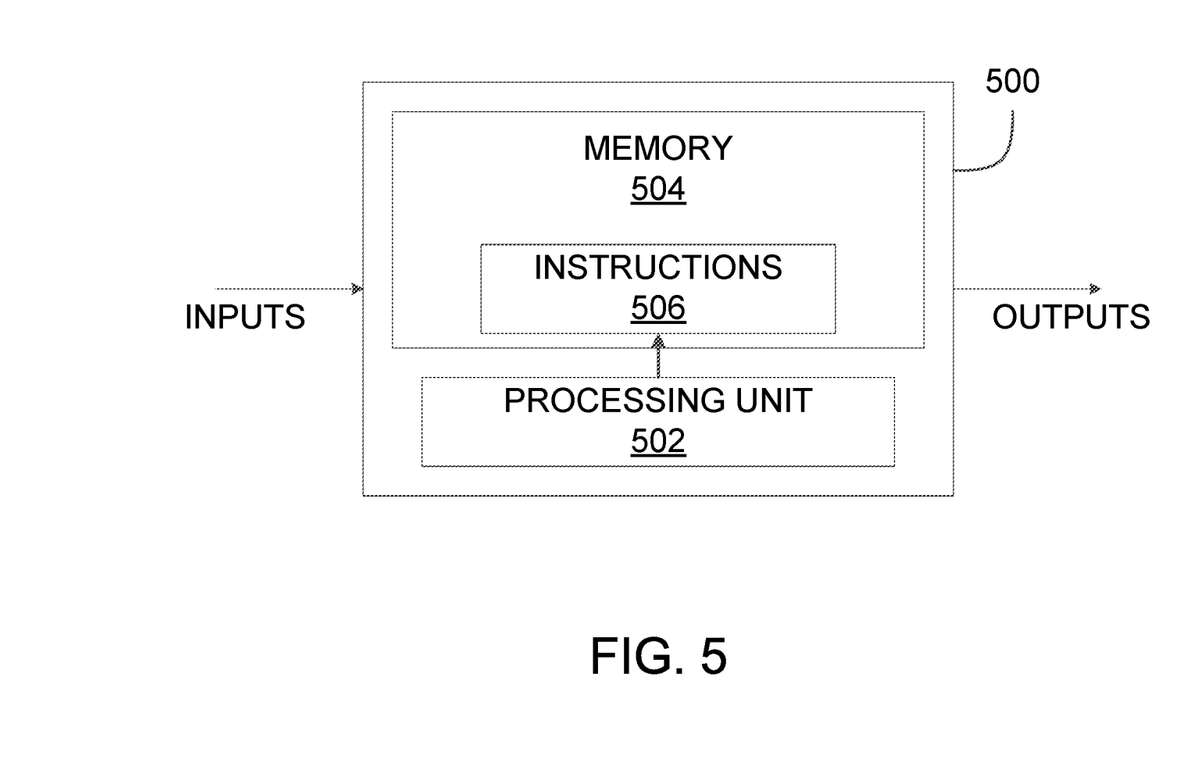
FIG. 5 is a block diagram of an example computing device.

With reference to FIG. 5, an example of a computing device 500 is illustrated for performing some or all of the functions of the measuring circuit 222. The measuring circuit 222, or any other device configured for measuring the axial position of a rotating component as described herein, may be implemented with one or more computing devices 500. For example, a first computing device 500 may be used to implement the amplitude detection unit 402 and a second computing device 500 may be used to implement the speed detector 404. Alternatively, a single computing device may be used to implement both the amplitude detection unit 402 and the speed detector 404. Other embodiments may also apply.

The computing device 500 may form part or all of a Full Authority Digital Engine Control (FADEC), Electronic Engine Control (EEC), Engine Control Unit (ECU), electronic propeller control (EPEC), propeller control unit (PCU), and the like.

The computing device 500 comprises a processing unit 502 and a memory 504 which has stored therein computer-executable instructions 506. The processing unit 502 may comprise any suitable devices configured to implement a method, such that instructions 506, when executed by the computing device 500 or other programmable apparatus, may cause functions/acts/steps as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Figure 6:
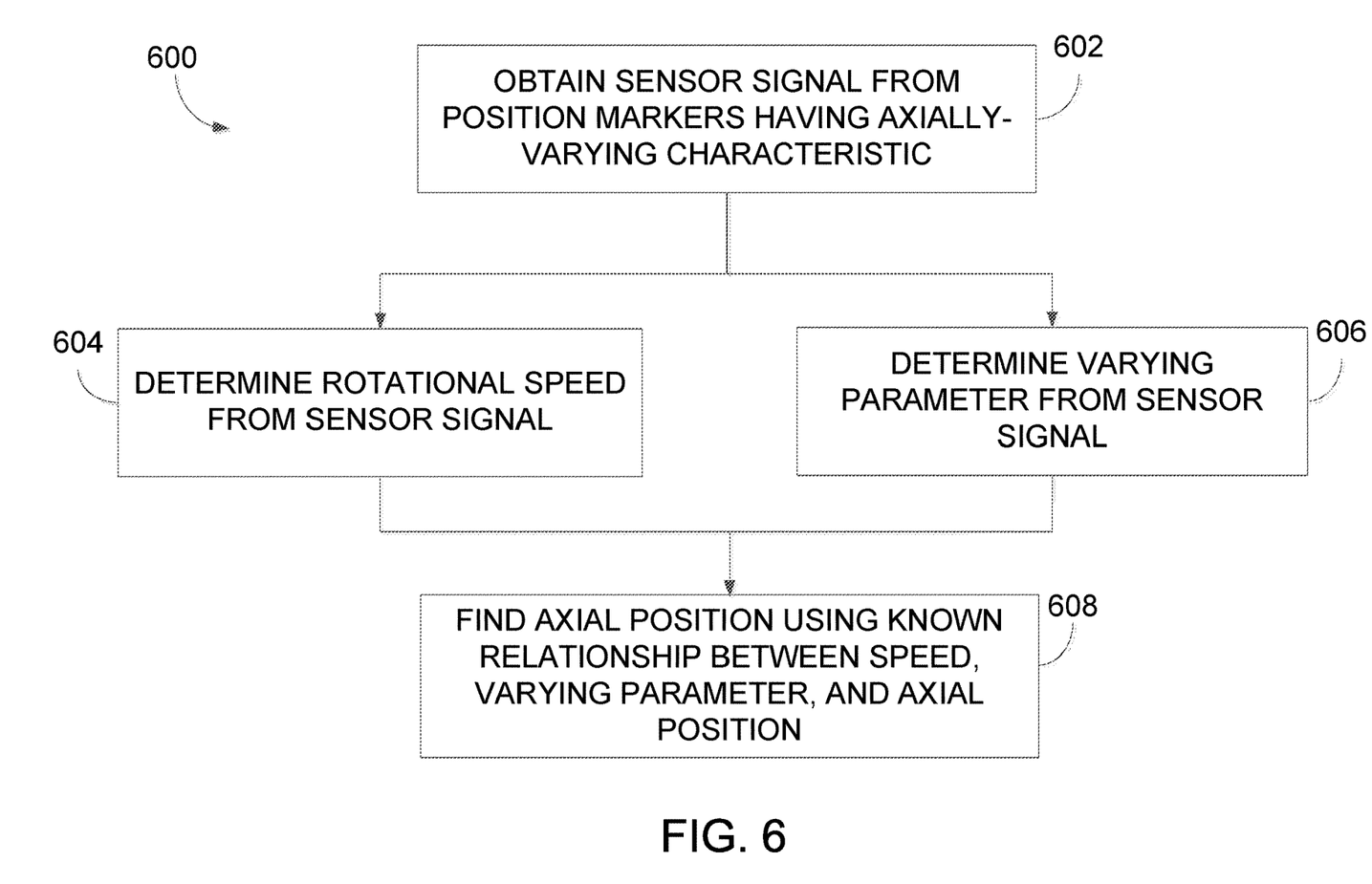
FIG. 6 is a flowchart of an example method for measuring an axial position of a rotating component of an engine.

FIG. 6 illustrates a method 600 for measuring an axial position of a rotating component of an engine, as implemented by the measuring circuit 222, for example in part or in whole by the computing device 500. At step 602, the sensor signal is received. As indicated above, the position markers 202 have an axially varying characteristic that causes a change in a varying parameter of the sensor signal as a function of a relative axial position between the sensor and the position marker.

At steps 604 and 606, which may be performed concurrently or sequentially, the sensor signal is processed in two different manners to obtain two different outputs. At step 604, the rotational speed is determined from the sensor signal, for example using a zero-crossing detection technique. At step 606, the varying parameter of the signal is determined, for example using a rectifier or a peak detector if the varying parameter is amplitude. At step 608, the axial position of the rotating component is determined using the known relationship between the axial position, the rotational speed and the varying parameter. Other parameters that may affect the sensor signal, such as the magnetic properties and the electrical load, are kept constant to allow the axial position to be determined based on the varying parameter.

In some embodiments, the axially-varying characteristic of the position markers is an axially-sloped surface, thus creating an axially varying air gap between the position marker and the sensor. In other embodiments, the axially-varying characteristic is an axially varying permeability of the surface of the position marker. Other embodiments may also apply.

In some embodiments, troughs between the position markers also have the same axially-varying characteristic as the position markers, such that the characteristic is constant across a cross-section of the feedback device that is perpendicular to the axial direction.

The methods and systems for measuring an axial position of a rotating component of an engine described herein may be implemented in a high level procedural or object oriented programming or scripting language, or a combination thereof, to communicate with or assist in the operation of a computer system, for example the computing device 500. Alternatively, the methods and systems for measuring an axial position of a rotating component of an engine may be implemented in assembly or machine language. The language may be a compiled or interpreted language. Program code for implementing the methods and systems for measuring an axial position of a rotating component of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for measuring an axial position of a rotating component of an engine may also be considered to be implemented by way of a non-transitory computer-readable storage medium having a computer program stored thereon. The computer program may comprise computer-readable instructions which cause a computer, such as the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present disclosure will be apparent to those skilled in the art, in light of a review of this disclosure.

Various aspects of the methods and systems for measuring an axial position of a rotating component of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The scope of the following claims should not be limited by the embodiments set forth in the examples, but should be given the broadest reasonable interpretation consistent with the description as a whole.

The invention claimed is:

1. A method for measuring an axial position of a rotating component of an engine, the method comprising:
rotating the rotating component, the rotating component having a plurality of position markers distributed about a surface thereof, the position markers having an axially varying characteristic;
receiving a signal from a sensor coupled to the rotating component;
using the position markers to cause a change in a varying parameter of the signal from the sensor as a function of the axial position of the rotating component, the signal varying with a rotational speed of the rotating component and with a variation in the axial position of the rotating component;
determining the rotational speed of the rotating component from the signal from the sensor;
determining a value of the varying parameter of the signal from the sensor; and
determining the axial position of the rotating component as a function of the rotational speed of the rotating component and of the value of the varying parameter of the signal from the sensor;
wherein the varying parameter of the signal is amplitude.

2. The method of claim 1, wherein determining the axial position of the rotating component comprises inputting the rotational speed and the varying parameter of the signal into at least one lookup table and outputting the axial position from the at least one lookup table.

3. The method of claim 2, wherein the at least one lookup table comprises a first lookup table that outputs an air gap between the sensor and the position markers based on the varying parameter of the signal and the rotational speed, and a second lookup table that outputs the axial position based on the air gap.

4. The method of claim 2, wherein determining the axial position of the rotating component comprises interpolating two axial positions when the varying parameter of the signal is between a first value associated with a first axial position and a second value associated with a second axial position, for a given rotational speed.

5. The method of claim 1, wherein the axially varying characteristic is an axially varying slope across a top surface of the position markers, to create an axially varying air gap between the position markers and the sensor.

6. The method of claim 1, wherein the position markers are provided on a feedback device that is mounted to the rotating component.

7. The method of claim 6, wherein the feedback device further comprises troughs positioned between the position markers, the troughs also having the axially varying characteristic of the position markers.

8. The method of claim 1, wherein determining the rotational speed of the rotating component from the signal comprises applying a zero-crossing detection method.

9. A system for measuring an axial position of a rotating component of an engine, the system comprising:
a plurality of position markers distributed about a surface of the rotating component, the position markers having an axially varying characteristic;
a sensor coupled to the rotating component and configured to generate a signal having a varying parameter as the rotating component rotates; and
a measuring circuit coupled to the sensor and configured to:
receive the signal from the sensor, the position markers causing the signal from the sensor to vary with a rotational speed of the rotating component and with a variation in the axial position of the rotating component;
determine the rotational speed of the rotating component from the signal from the sensor;
determine the varying parameter of the signal from the sensor; and
determine the axial position of the rotating component as a function of the rotational speed of the rotating component and the varying parameter of the signal from the sensor.

10. The system of claim 9, wherein determining the axial position of the rotating component comprises inputting the rotational speed and the varying parameter of the signal into at least one lookup table and outputting the axial position from the at least one lookup table.

11. The system of claim 10, wherein the at least one lookup table comprises a first lookup table that outputs an air gap between the sensor and the position markers based on the varying parameter and the rotational speed, and a second lookup table that outputs the axial position based on the air gap.

12. The system of claim 10, wherein determining the axial position of the rotating component comprises interpolating two axial positions when the varying parameter of the signal is between a first value associated with a first axial position and a second value associated with a second axial position, for a given rotational speed.

13. The system of claim 9, wherein the axially varying characteristic is an axially varying slope across a top surface of the position markers, to create an axially varying air gap between the position markers and the sensor.

14. The system of claim 9, further comprising a feedback device mounted to the rotating component and having the position markers provided thereon.

15. The system of claim 14, wherein the feedback device further comprises troughs positioned between the position markers, the troughs also having the axially varying characteristic of the position markers.

16. The system of claim 9, wherein the measuring circuit applies a zero-crossing detection for determining the rotational speed of the rotating component from the signal.

17. The system of claim 9, wherein the varying parameter of the signal is amplitude.

18. The system of claim 17, wherein the measuring circuit comprises a rectifier for determining the amplitude of the signal.

19. A non-transitory computer readable medium having stored thereon program instructions executable by a processing unit for measuring an axial position of a rotating component of an engine, the rotating component having a plurality of position markers distributed about a surface thereof, the position markers having an axially varying characteristic, the program instructions configured for:
- receiving a signal from a sensor coupled to the rotating component;
- detecting a change in a varying parameter of the signal from the sensor caused by the position markers as a function of the axial position of the rotating component, the signal varying with a rotational speed of the rotating component and with a variation in the axial position of the rotating component;
- determining the rotational speed of the rotating component from the signal from the sensor;
- determining a value of the varying parameter of the signal from the sensor; and
- determining the axial position of the rotating component as a function of the rotational speed of the rotating component and of the value of the varying parameter of the signal from the sensor;
- wherein the varying parameter of the signal is amplitude.

* * * * *